United States Patent [19]

Lankinen et al.

[11] Patent Number: 4,687,583
[45] Date of Patent: Aug. 18, 1987

[54] PROCEDURE FOR FILTERING LIME SLUDGE MEANT TO BE REGENERATED TO LIME

[75] Inventors: Matti Lankinen; Holger Engdahl; Raimo Kohonen; Jukka Niskanen; Markku Kosonen, all of Savonlinna, Finland

[73] Assignee: Enso-Gutzeit Oy

[21] Appl. No.: 838,921

[22] Filed: Mar. 12, 1986

[30] Foreign Application Priority Data

Mar. 26, 1985 [FI] Finland .................................. 851203

[51] Int. Cl.⁴ ............................................. B01D 33/06
[52] U.S. Cl. .................... 210/739; 210/784; 210/928
[58] Field of Search ............... 210/104, 107, 143, 739, 210/744, 784, 928

[56] References Cited

U.S. PATENT DOCUMENTS

| | | | |
|---|---|---|---|
| 2,805,773 | 9/1957 | Mecklin et al. | 210/107 |
| 3,344,921 | 10/1967 | Fegan, Jr. | 210/143 |
| 3,616,908 | 11/1971 | Rokitansky et al. | 210/739 |
| 4,053,352 | 10/1977 | Hultman et al. | 210/928 |

Primary Examiner—Richard V. Fisher
Assistant Examiner—Jeffrey W. Peterson
Attorney, Agent, or Firm—Toren, McGeady & Associates

[57] ABSTRACT

In a procedure for filtering lime sludge meant to be regenerated to lime. Lime sludge is produced in the causticizing process in a sulphate cellulose mill, where it can be reused after regeneration to lime. In the procedure, lime sludge suspension is filtered on a filter drum in continuous rotation by depositing lime sludge on the drum and detaching part of the superficial layer of the lime sludge on the drum with a scraper so that the deeper lime sludge layer on the drum, which by-passes the scraper, serves as filtering medium for the superficial layer that is detached (as a so-called pre-coat). The purpose is to arrange the control of the filtering process so that the dry matter content of the lime sludge detached from the drum is substantially constant, and its essential feature is that the dry matter content of the lime sludge detached from the drum is followed so that when the dry matter content tends to decrease, the speed of rotation of the drum is first raised within a given control range and, after the control range has been used up, the scraper is moved closer to the surface of the drum so that at least part of the deeper lime sludge layer on the drum, serving as filtering medium, is detached and, if the scraper is returned to its earlier position, is replaced with a new lime sludge layer, whereupon the control is again continued with the aid of the drum's speed of rotation.

5 Claims, 2 Drawing Figures

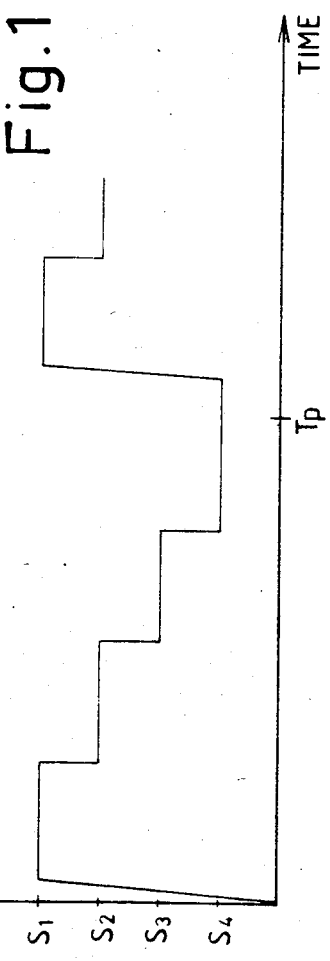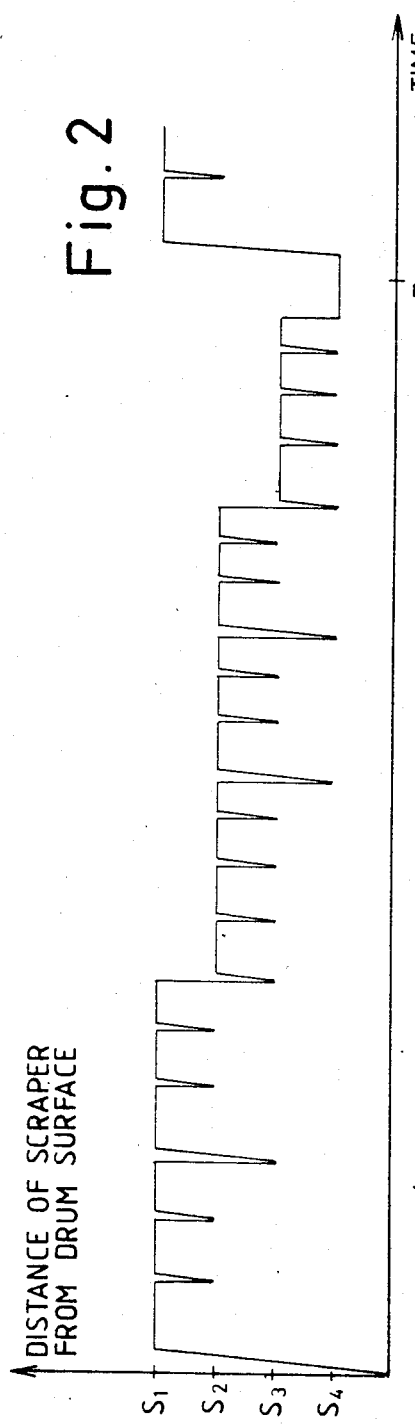

PROCEDURE FOR FILTERING LIME SLUDGE MEANT TO BE REGENERATED TO LIME

The present invention concerns a procedure for filtering lime sludge meant to be regenerated to lime wherein lime sludge suspension is filtered on a filter drum in continuous rotation by depositing lime sludge on the drum and detaching the superficial layer of the lime sludge on the drum with a scraper in such manner that the deeper lime sludge layer which by-passes the scraper serves as filtering medium for the superficial layer that is being detached, and wherein the filtering process is controlled in order to keep the dry matter content of the lime sludge detached from the drum substantially constant.

In connection with the manufacturing of sulphate cellulose, regeneration of the digestion chemicals is carried out by causticizing the soda liquor that has been produced to become white liquor that can be reused in the process. As a result of such causticizing, lime sludge is obtained in addition to white liquor, this white liquor consisting mainly of calcium carbonate precipitation. The lime sludge is regenerated by burning it to become unslaked lime that can be reused in the causticizing process.

Prior to the burning, taking place in a kiln, the lime sludge suspension obtained in the causticizing process is dried. Best possible drying is in the interest of minimum energy consumption in the kiln, because the least possible amount of energy will then be used for evaporating water. For such drying, drum filters have been used in which the so-called pre-coat technique is applied, in which lime sludge is deposited, with the aid of vacuum suction conducted through the interior of the drum, in layers on the drum and detached therefrom with a scraper in such manner that the detaching action only acts on the superficial layer of the lime sludge on the drum. The stationary lime sludge layer under said superficial layer, the so-called pre-coat, will then serve merely as a filtering medium.

In order that the lime sludge kiln might operate uniformly and under standardized conditions, it is moreover important that the dry matter content of the lime sludge is as constant as possible all the time. In existing lime sludge filtering processes based on the pre-coat technique, the control has effect on the capacity of the filter drum, on the consistency of the lime sludge suspension supplied to the filter, and on the quantity of washing water used. No uniform enough dry matter content of the lime sludge has been achieved with the aid of these expedients: the moisture content of the lime sludge has tended to increase during the process. The obvious cause responsible herefor is clogging of the pre-coat, serving as filter, and consequent reduction of filtering capacity.

The object of the present invention is to eliminate said drawback, occurring in existing filtering processes, by elaborating a lime sludge filtering process which produces lime sludge having a substantially constant dry matter content. The invention is characterized in that the process is controlled by following the dry matter content of the lime sludge detached from the drum, so that when the dry matter content tends to decrease the speed of rotation of the drum is first raised within a given control range and, after the range of control has been used up, the scraper is moved closer to the drum surface so that at least part of the deeper lime sludge layer (the pre-coat) on the drum, serving as filtering medium, is detached, whereupon control with the aid of the drum's speed of rotation is resumed.

The invention is substantially based on the fact that the moisture content of the lime sludge layer on the drum is lowest on the outer surface of said layer and thereafter increases in the direction inward, towards the drum's surface. Thus, the driest possible lime sludge is obtained by scraping from the drum a lime sludge layer of least possible thickness, and the layer that is being scraped off can be made thinner, without incurring reduction of the filter's capacity, by increasing the speed of rotation of the drum. It is however unprofitable, or impossible, to increase the speed of rotation of the drum ad infinitum; after a given limit has been reached, one reduces instead the thickness of the plugged pre-coat with the aid of the scraper, and this likewise results in increased dry matter content of the lime sludge. It is true that the pre-coat removal momentarily lowers the dry matter content of the lime sludge detached from the drum, and it may therefore be necessary to increase the speed of rotation of the drum even further, but after this intermediate phase the speed of rotation may be returned to the lower limit of its control range or close to this limit, whereby this control range is once again available for use in controlling the process.

When the scraper is moved closer to the surface of the drum from the purpose of detaching part of the lime sludge layer acting as filtering medium, or the pre-coat, it may happen that the scraper remains in this new position during further continuation of the process. It is also possible, on the other hand, that the scraper is returned to its initial position, in which case the reciprocating movement of the scraper has the effect that part of the lime sludge layer forming the pre-coat is detached and is thereafter replaced with a new lime sludge layer.

The lime sludge dry matter content appropriate in view of the operation of the lime sludge, which can be achieved by the process of the invention, is about 80%. The so-called rated speed of the filter drum, which is the highest speed of rotation that can be contemplated in practice, may be from 1 to 10, preferably from 2 to 10 r.p.m., and the control range within which the speed of rotation of the drum is raised in connection with process control is preferably about 60 to 85% of the rated speed. However, it may be necessary immediately upon renewing the pre-coat to use momentarily higher speeds, even up to the full rated speed.

The invention is described in the following in greater detail with the aid of examples, referring to the attached drawing, wherein FIGS. 1 and 2 show graphically the distance of the scraper from the surface of the filter drum, plotted over time, in two exemplary cases.

In both exemplary cases the scraper may assume four different positions, their distances from the surface of the drum $S_1$, $S_2$, $S_3$ and $S_4$. In both cases, the filtering treatment of the lime sludge is commenced by setting the scraper in the position having the greatest distance $S_1$ from the drum surface, whereby the lime sludge layer accumulating on the surface of the drum and serving as filtering medium, i.e. the pre-coat, will grow to thickness $S_1$. Hereafter, control of the filtering process takes place with the aid of the drum's speed of rotation and, after the speed control range has been used up, by shifting the scraper into a position closer to the surface of the drum so that part of the pre-coat is detached. In the case depicted in FIG. 1, the principle is to move the scraper gradually closer to the surface of the drum so that the pre-coat is correspondingly reduced in thickness. When the drum's speed control range in position $S_4$ has been used up, the pre-coat cannot be made thinner any more; instead, the process is interrupted at the time $T_p$ and removal of the remaining pre-coat and cleaning of the drum's surface is performed by blowing. Hereafter, the scraper is again moved into position $S_1$ and the process continued as described before. In the case depicted in FIG. 2, again, the main principle is that after the drum speed range has been used up a reciprocating movement of the scraper is performed, so that part of the lime sludge layer constituting the pre-coat is detached and thereafter replaced with a new lime sludge layer. As can be seen in the figure, the thickness of the lime sludge layer renewed at any one time may vary, and in this case too the basic position of the scraper moves gradually closer to the surface of the drum, until at the moment $T_p$ removal of the innermost pre-coat layer by blowing is performed.

The control of the filtering process with the aid of the drum speed, e.g. in the initial phase of the process of FIG. 2,, may take place as follows.

The scraper is set in position $S_1$ and the filter drum is rotated at the speed 0.60 $n_r$ ($n_r$=rated speed of rotation).

The dry matter meter measures the dry matter content of the lime sludge detached from the drum, finding it to be 80%.

The dry matter content goes down to 79%.

The drum speed is raised, on a signal from the dry matter meter, to 0.65 $n_r$.

The dry matter content increases to 80%.

When the dry matter content again falls, the drum speed is increased in order to maintain the dry matter content on the level of 80%, and this procedure is continued by steps until the drum is rotating at the speed 0.85 $n_r$.

At the speed 0.85 $n_r$, the dry matter content goes down to 79%.

The scraper is moved closer to the surface of the drum into position $S_2$, whereby the outermost part of the pre-coat is detached.

The scraper is returned into position $S_1$, whereby a new outer layer is formed in place of the detached outer layer of the pre-coat.

In order to counteract the transient decrease of the dry matter content of the detached lime sludge, the drum speed is raised to 1.0 $n_r$ until the dry matter content has increased to the level of 80%.

The drum speed is reduced by steps to 0.70 $n_r$, the dry matter content remaining on the 80% level.

and so on.

The control of the filtering process in accordance with the principles evident from the foregoing can be arranged to take place by automatic control, and in that case a wide variety of arrangements may be contemplated e.g. for making the scraper move from one position to another. It is therefore understood that the examples presented in the foregoing, which are only meant to illustrate the principles of the invention, impose no restriction whatsoever on the invention and that its embodiments may vary within the scope of the claims following below.

We claim:

1. A procedure for filtering lime sludge meant to be regenerated to lime, comprising filtering a lime sludge suspension on a filter drum in continuous rotation by depositing lime sludge on the drum and detaching part of the superficial layer of the lime sludge on the drum with a scraper so that the deeper lime sludge layer on the drum, which by-passes the scraper, serves as filtering medium for the superficial layer that is detached, and controlling the filtering process to maintain the dry matter content of the lime sludge detached from the drum substantially constant, wherein the step for controlling the filtering process comprises detaching the superficial layer of lime sludge from the filter drum and checking the dry matter content of the lime sludge detached from the drum, increasing the speed of rotation of the drum incrementally when the dry matter content tends to decrease within a given control range of the speed of rotation and, after the control range has been used up, moving the scraper closer to the surface of the drum and detaching at least part of the deeper lime sludge layer on the drum, serving as filtering medium, and continuing the control based on the speed of rotation of the drum.

2. Procedure according to claim 1, including moving the scraper in a reciprocating manner so that part of the lime sludge layer serving as filtering medium is detached and replacing the detached lime sludge layer serving as a filtering medium with a new lime sludge layer.

3. Procedure according to claim 1, including maintaining the dry matter content of the lime sludge detached from the drum at about 80%.

4. Procedure according to claim 1, including maintaining the given control range of the speed of rotation of the drum from about 60 to 85% of the maximum speed, which is from 1 to 10 r.p.m., whereafter at least partly renewing the deeper lime sludge layer serving as filtering medium by a scraper movement.

5. Procedure according to claim 1, including maintaining the given control range of the speed of rotation of the drum from about 60 to 85% of the maximum speed which is from 2 to 10 r.p.m., whereafter at least partly renewing the deeper lime sludge layer serving as filtering medium by a scraper movement.

* * * * *